United States Patent
Thirunavukkarasu et al.

(10) Patent No.: US 12,099,967 B2
(45) Date of Patent: Sep. 24, 2024

(54) METHOD AND SYSTEM FOR DETECTION OF HIDDEN PATTERNS FOR APPAREL STRATEGIES

(71) Applicant: TATA CONSULTANCY SERVICES LIMITED, Mumbai (IN)

(72) Inventors: Jeisobers Thirunavukkarasu, Chennai (IN); Pranoy Hari, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 428 days.

(21) Appl. No.: 17/473,416

(22) Filed: Sep. 13, 2021

(65) Prior Publication Data

US 2022/0222613 A1    Jul. 14, 2022

(30) Foreign Application Priority Data

Jan. 13, 2021    (IN) .............................. 202121001727

(51) Int. Cl.
*G06K 9/00* (2022.01)
*G06F 18/2135* (2023.01)
(Continued)

(52) U.S. Cl.
CPC ....... *G06Q 10/087* (2013.01); *G06F 18/2135* (2023.01); *G06Q 30/0201* (2013.01); *G06Q 30/0202* (2013.01)

(58) Field of Classification Search
CPC ............. G06Q 10/087; G06Q 30/0201; G06Q 30/0202; G06F 18/2135
See application file for complete search history.

(56) References Cited

U.S. PATENT DOCUMENTS

| | | | |
|---|---|---|---|
| 2009/0116698 A1* | 5/2009 | Zhang ................ | G06Q 30/0601 345/581 |
| 2011/0082764 A1* | 4/2011 | Flusser .............. | G06Q 30/0631 705/26.7 |

(Continued)

OTHER PUBLICATIONS

Author: Emon Kumar Dey, Md. Nurul Ahad Tawhid and Mohammad Shoyaib Title: An Automated System for Garment Texture Design Class Identification Title of the item: Computers Date: Sep. 2015 pp. 265-282 Publisher: MDPI Link: https://www.mdpi.com/2073-431X/4/3/265.

(Continued)

*Primary Examiner* — Talia F Crawley
(74) *Attorney, Agent, or Firm* — FINNEGAN, HENDERSON, FARABOW, GARRETT & DUNNER, LLP

(57) ABSTRACT

In retail, absence of customer intended product and availability of customer unintended product in a store leads to lost sales opportunity and over inventory problems. In apparel retailing, underlying characteristics that is common across many apparels such as common size, common brand, common color, and common pattern, etc., indicates intention of population buying those apparels. The approach for detection of underlying pattern that is present across many apparels is challenging. Embodiments of the present disclosure provide a method and system for estimating lost sales opportunities and over inventory due to apparel pattern in a store or online by detecting hidden apparel patterns. It also provides apparel pattern strategies related with assortment, advertisement, and manufacturing by leveraging the estimated lost sales opportunity and over inventory.

13 Claims, 3 Drawing Sheets

(51) Int. Cl.
*G06K 9/46* (2006.01)
*G06K 9/64* (2006.01)
*G06Q 10/087* (2023.01)
*G06Q 30/0201* (2023.01)
*G06Q 30/0202* (2023.01)

(56) References Cited

U.S. PATENT DOCUMENTS

| | | | |
|---|---|---|---|
| 2011/0142335 A1* | 6/2011 | Ghanem | G06F 16/5838 |
| | | | 382/218 |
| 2016/0171365 A1* | 6/2016 | Stepanovskiy | G06N 20/00 |
| | | | 706/9 |
| 2016/0210602 A1* | 7/2016 | Siddique | G06Q 20/047 |
| 2017/0091844 A1* | 3/2017 | Yarvis | G06N 20/00 |
| 2017/0236185 A1* | 8/2017 | Dalal | G06Q 30/0623 |
| | | | 705/26.7 |
| 2020/0019811 A1* | 1/2020 | Kim | G06F 18/24 |
| 2020/0104633 A1* | 4/2020 | Zheng | G06Q 30/0643 |
| 2021/0192597 A1* | 6/2021 | Thirunavukkarasu | |
| | | | G06Q 30/0631 |

OTHER PUBLICATIONS

Author: Kar Seng Loke Title: An approach to textile recognition Title of the item: Open access peer-reviewed chapter Date: Oct. 2009 Publisher: Intech Open Link: https://www.intechopen.com/chapters/9168.

* cited by examiner

METHOD AND SYSTEM FOR DETECTION OF HIDDEN PATTERNS FOR APPAREL STRATEGIES

PRIORITY CLAIM

This U.S. patent application claims priority under 35 U.S.C. § 119 to: India Application No. 202121001727, filed on Jan. 13, 2021. The entire contents of the aforementioned application are incorporated herein by reference.

TECHNICAL FIELD

The embodiments herein generally relate to pattern detection and, more particularly, to a method and system for detection of hidden patterns for apparel strategies.

BACKGROUND

Apparel assortment is one of the biggest challenges in retailing, where identifying the variety of products that people want to buy and estimate the right amount of stock per identified product is critical. Determining the right proportion on how many product variations to be maintained and quantity of product to be stocked is critical. For example, due to too much of stock with same pattern, retailer ends up in capital investment in excess inventory that may affect the profit margin, whereas due to too little stock with preferred pattern, retailer may lose sales opportunity. Thus, in apparel retailing, absence of customer intended apparel pattern and availability of customer unintended pattern in a store or online portal leads to lost sales opportunity and over inventory problems.

In apparel industry, pattern is defined as a repeating of an element or motif used to create a unique decoration on fabrics. Few examples of pattern are checkered pattern, striped pattern, logo pattern and slogan pattern. Customer pattern preferences are visual perception of apparel design by customers and finding of common pattern across apparels is key for many retail strategies. Customer preferences of pattern vary over a period of time. Success of apparel industry depends on how early retailer are able to realize the current trend in pattern and to keep the apparels with latest trend in their assortment.

Customer preferences are addressed by retailers by keeping suitable assortment through breadth and depth measures of each attribute such as size, brand, color, pattern. In retail term, breadth of assortment denotes the selection of apparels for the coming season and depth of assortment indicates number of facings or number of items to be displayed in the coming sales season. Breadth and depth of assortment may be done by considering size, color, brand, and pattern. Retailers face challenges to decide the breadth and depth of assortment based on pattern.

Existing methods use expert's opinion to get current trend related with apparel patterns for assortment and the responses are based on their experience. In addition, it is possible to make breadth and depth of assortment by considering size, color, brand using historical sales.

SUMMARY

Embodiments of the present disclosure present technological improvements as solutions to one or more of the above-mentioned technical problems recognized by the inventors in conventional systems.

For example, in one embodiment, a method for detection of hidden patterns for apparel strategies is provided.

The method includes receiving a plurality of images of apparel patterns for a predefined time span from a plurality of sources comprising (1) open source (2) retail planogram and (3) point of sales (POS) system of a retailer;

Thereafter, the method includes classifying and tagging the plurality of images into a plurality of types based on a source among the plurality of sources associated with each of the plurality of images, wherein the plurality of types comprise (1) a first type indicative of customer intention when the source is the open source, (2) a second type indicative of retailer intention when the source is the retail planogram and (3) a third type indicative of customer buying behavior when the source is the POS system.

Further, the method includes determining a breadth, a depth and a lifespan of a plurality of significant underlying patterns of each type, wherein the plurality of significant underlying patterns for each type are identified by performing principal component analysis (PCA) on a set of images among the plurality of images of apparel patterns tagged to each type.

Furthermore, the method includes estimating lost sales opportunity, an over inventory and hit rate of the retailer by comparing breadth and depth of the apparel patterns across the plurality of types.

Furthermore, the method includes recommending a plurality of apparel strategies comprising 1) apparels to be added and removed in brick and mortar stores and in online retailing of the retailer and 2) advertisement strategies and manufacturing strategies to the retailer based on the estimated lost sales opportunity, over inventory and hit rate.

In another aspect, a system for detection of hidden patterns for apparel strategies is provided. The system comprises a memory storing instructions; one or more Input/Output (I/O) interfaces; and one or more hardware processors coupled to the memory via the one or more I/O interfaces, wherein the one or more hardware processors are configured by the instructions to receive a plurality of images of apparel patterns for a predefined time span from a plurality of sources comprising (1) open source (2) retail planogram and (3) point of sales (POS) system of a retailer;

Thereafter, classify and tag the plurality of images into a plurality of types based on a source among the plurality of sources associated with each of the plurality of images, wherein the plurality of types comprise (1) a first type indicative of customer intention when the source is the open source, (2) a second type indicative of retailer intention when the source is the retail planogram and (3) a third type indicative of customer buying behavior when the source is the POS system.

Further, determine a breadth, a depth and a lifespan of a plurality of significant underlying patterns of each type, wherein the plurality of significant underlying patterns for each type are identified by performing principal component analysis (PCA) on a set of images among the plurality of images of apparel patterns tagged to each type.

Furthermore, estimate lost sales opportunity, an over inventory and hit rate of the retailer by comparing breadth and depth of the plurality of significant underlying patterns across the plurality of types.

Furthermore, recommend a plurality of apparel strategies comprising 1) apparels to be added and removed in brick and mortar stores and in online retailing of the retailer and 2) advertisement strategies and manufacturing strategies to the retailer based on the estimated lost sales opportunity, over inventory and hit rate.

In yet another aspect, there are provided one or more non-transitory machine-readable information storage mediums comprising one or more instructions, which when executed by one or more hardware processors causes a method for detection of hidden patterns for apparel strategies.

The method includes receiving a plurality of images of apparel patterns for a predefined time span from a plurality of sources comprising (1) open source (2) retail planogram and (3) point of sales (POS) system of a retailer;

Thereafter, the method includes classifying and tagging the plurality of images into a plurality of types based on a source among the plurality of sources associated with each of the plurality of images, wherein the plurality of types comprise (1) a first type indicative of customer intention when the source is the open source, (2) a second type indicative of retailer intention when the source is the retail planogram and (3) a third type indicative of customer buying behavior when the source is the POS system.

Further, the method includes determining a breadth, a depth and a lifespan of a plurality of significant underlying patterns of each type, wherein the plurality of significant patterns for each type are identified by performing principal component analysis (PCA) on a set of images among the plurality of images of apparel patterns tagged to each type.

Furthermore, the method includes estimating lost sales opportunity, an over inventory and hit rate of the retailer by comparing breadth and depth of the apparel patterns across the plurality of types.

Furthermore, the method includes recommending a plurality of apparel strategies comprising 1) apparels to be added and removed in brick and mortar stores and in online retailing of the retailer and 2) advertisement strategies and manufacturing strategies to the retailer based on the estimated lost sales opportunity, over inventory and hit rate. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
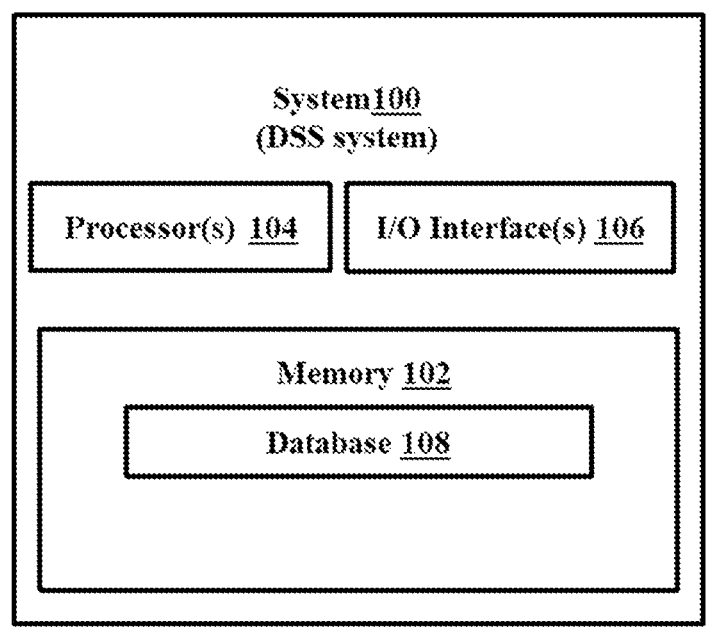
FIG. 1 is a functional block diagram of a system, interchangeably referred as Decision Support Services (DSS) system, for detection of hidden patterns for apparel strategies, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments of the present disclosure provide a method for detection of hidden patterns for apparel strategies. The apparel image data is analyzed by comparing (a) underlying patterns (also interchangeably referred as hidden patterns, significant underlying patterns or significant patterns) that is derived from one source of apparel images with (b) underlying pattern that is derived from other source of apparel images to identify gap between intention of different sources with respect to apparel patterns and provide apparel strategies to a retailer. The method provides an integrated analysis of apparel image data to identify significant underlying patterns across different source types, wherein each source represents varied intentions covering customer buying behavior, retailer's intentions, and customer intentions. The integrated apparel image data related to recent sales enables more accurate decision support services or apparel strategies derived from the underlying patterns across varied sources to address assortment strategies, retailer's strategies related with advertisement and manufacturing.

The system, interchangeably referred as Decision Support System (DSS), supports decision making process for apparel strategies to be recommended to a retailer having plurality of outlets. The apparel strategies include 1) apparels to be added and removed in brick and mortar stores and in online retailing of the retailer and 2) advertisement strategies and manufacturing strategies to the retailer based on the estimated lost sales opportunity, over inventory and hit rate The method includes integrating historical information associated with apparel related data, for a category, from varied type of sources. Further, the integrated historical information is utilized to create a plurality of segments within the plurality of outlets. For example, the category of interest can be 'T-shirts' for a garment retailer having online and offline outlets. The assortment has to be performed for the retailer for category of interest, wherein a segment among the plurality of segments can be urban outlets, rural outlets, etc. The segment denotes group of stores that are located in specific demographic areas such as segment with high income low density population with medium age grouped people, segment with low income high density occupied by older people Further, the method comprises, processing using principal component analysis (PCA), a plurality of images of the apparels for the category to obtain segment specific significant patterns of the apparels for each of the plurality of segments at the category level.

A lifespan of the significant patterns of the apparels is computed by mapping each of the significant patterns with a pattern lifespan repository to determine similarity between the significant patterns and type of patterns present in the pattern life span repository based on a threshold value. Further, the method includes estimating breadth of assortment of the apparels derived from the number of significant patterns based on the set of eigen vectors obtained during the PCA analysis. Further, the method includes determining depth of assortment based on the eigen values of the significant patterns.

Unlike existing works in literature, which utilize the PCA predominantly for dimensionality reduction of input data, the method herein utilizes PCA to determine underlying patterns, for (1) identification of distinct patterns that are present across many images and (2) estimation of the variance distributions which is used to decide breadth (indicative of variety of patterns to be maintained during the assortment) and depth (indicative of units per pattern). Further, the lifespan determination that method computes enables deciding on period for which the specific pattern may be active during assortment decisions than merely continuing identified significant patterns for undefined/random time spans.

Figure 2:
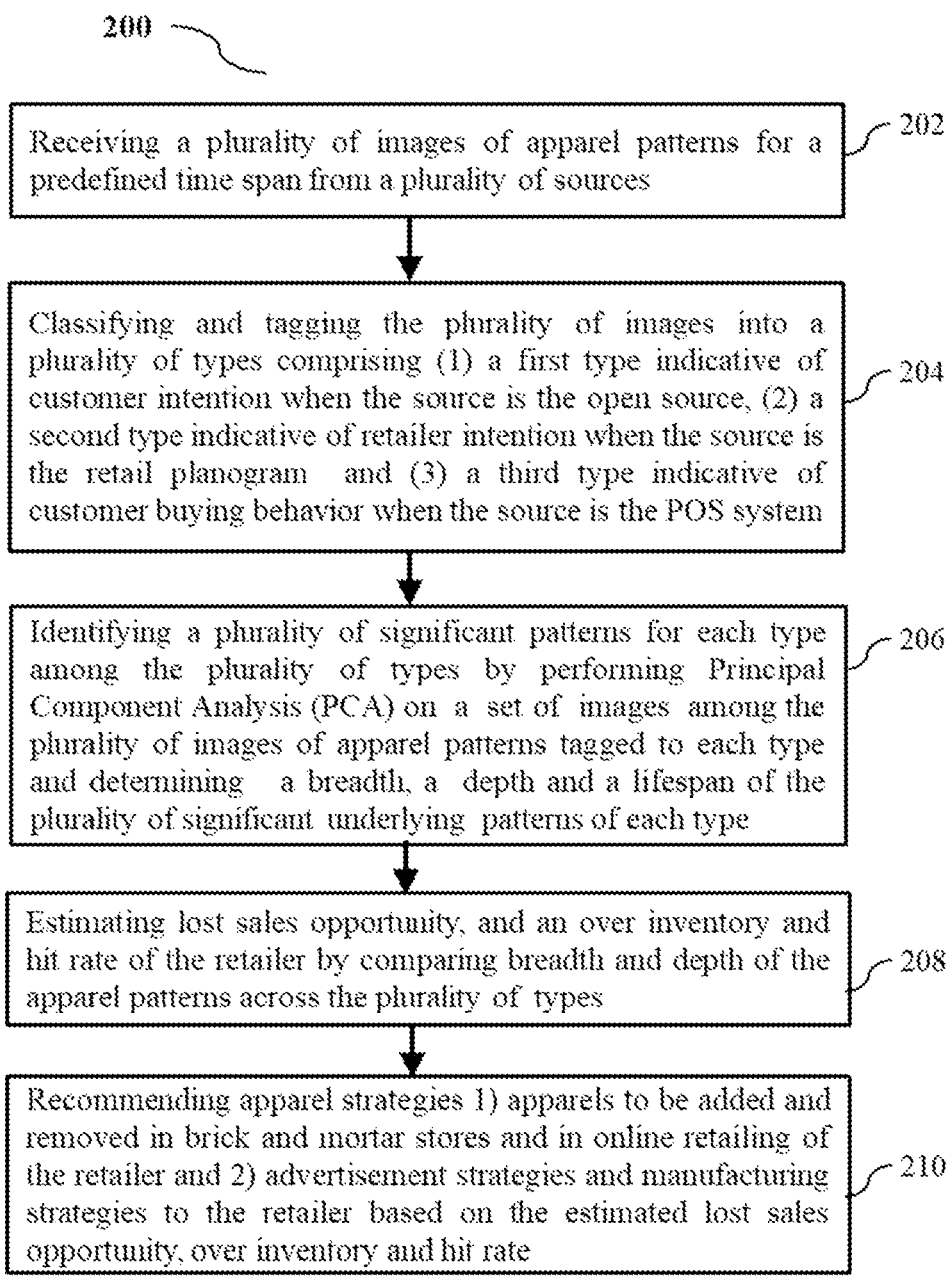
FIG. 2 is a flow diagram illustrating a method for detection of hidden patterns for apparel strategies, using the system of FIG. 1, in accordance with some embodiments of the present disclosure.
Figure 3:
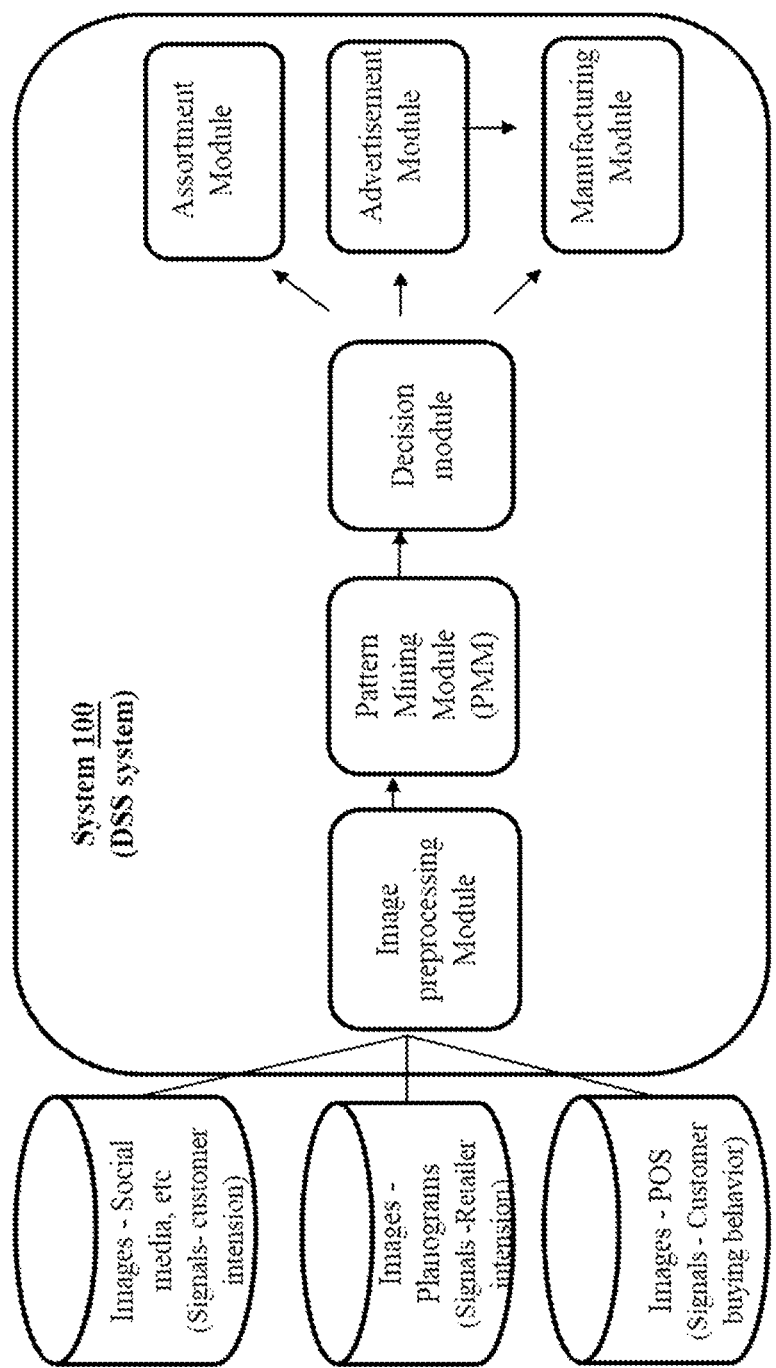
FIG. 3 in an example architecture of system of FIG. 1 for detection of hidden patterns for apparel strategies, in accordance with some embodiments of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 is a functional block diagram of a system 100 for apparel strategies based on detection of hidden patterns, in accordance with some embodiments of the present disclosure.

In an embodiment, the system 100, interchangeably referred as Decision Support Services (DSS) system, includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular, to gather historical information of plurality of categories of apparels identified by a retailer. In an embodiment, the I/O interface(s) 106 can include one or more ports for connecting to a number of external devices or to another server or devices. In an embodiment, the system 100 may utilize the cloud servers for computationally intensive data processing for apparel assortment.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include the database 108 comprising the received historical information and also stores the processed historical information providing segment specific information. The memory 102 may include a data collection module (not shown) to collect and integrate the historical information, an image extractor (not shown) to extract relevant images for further processing to identify significant pattern, a data processing module (not shown) further comprising an image preprocessing module, a Pattern Mining Module (PMM) and a Decision module (as shown in FIG. 3) that processes the extracted images using PCA. Further, the data processing module also includes a pattern life span estimator (not shown) for estimating life span of each of the significant pattern, wherein lifespan defines the duration of the trend for the significant pattern. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with flow diagram of FIG. 2 and architecture of FIG. 3.

FIG. 2 is a flow diagrams illustrating a method 200 providing apparel strategies based on detection of hidden patterns across images, using the system 100 of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

It is to be understood that the method 200 can applied individually for each of the plurality of categories defined by a retailer requesting for apparel strategies for the specific category of interest.

Referring to the steps of the method 200, the database 108 receives integrated data via the data collection module a plurality of images of apparel patterns for a predefined time span from a plurality of sources comprising (1) open source (2) retail planogram and (3) point of sales (POS) system of a retailer Example data resources are depicted in architecture of Decision Support Services (DSS) system of FIG. 3, which is an example architecture of system of FIG. 1 for hidden pattern detection based DSS for a category, in accordance with some embodiments of the present disclosure. The category refers to a group of products that are having similar buying preferences or having attribute values that are alternative to each other. Example for category are women's tops, women's suits, men's shirts, and men's suits, etc.

It will be appreciated that the one or more images of the one or more apparels, may be received in various ways within the scope of the present disclosure. As depicted in example architecture of FIG. 3, the received images, are preprocessed via the image preprocessing module executed by the one or more hardware processors to enable image categorization and orientation validation. Further, a Pattern Mining Module (PMM), performs PCA on the received images to identify top significant patterns for each source type for a category of interest. Thus, PMM identifies top common patterns that resides among the images and provide their importance in magnitude and their life span.

At step 202 of the method 200, the one or more hardware processors 102 receive a plurality of images of apparel patterns for a predefined time span from a plurality of sources comprising (1) open source (2) retail planogram and (3) Point of Sales (POS) system of a retailer.

Underlying characteristics that are present across many apparels such as common size, common brand, common color, and common pattern, etc., indicates intention of customers buying those apparels or intention of members dealing with those apparels. The source of apparel data that is analyzed and processed is a major factor while determining the underlying significant patterns of the apparel marketplace. In a scenario, the common feature that is present across fast selling apparels indicates its importance in customer buying behavior. The underlying feature could be a brand or a size or a pattern or other features. For example, considering T shirt category, if pattern 'logo with slogans' is present across many apparels bought, it indicates the popularity of 'logo with slogan' and in turn customer buying behavior. In another scenario, the common feature that is present across apparel that are popular in recent times in open sources such as social media, open forums, fashion websites, fashion events, etc., indicates customer preferences/intentions. In another scenario, the common feature that is present across apparel that are kept in the store or that are displayed in online retailing indicates retailer marketing intention.

Identification of customer preferences with respect to pattern is challenging as pattern is combination of many elements to form a unique decoration and also they have variations within patterns. For example, within stripe patterns, there are many variations such as hairline stripes, pinstripes, candy stripes, Bengal stripes, barcode stripes, chalk stripes, etc. Similarly, many variations exist within checked pattern such as buffalo check, mini-check, pin check, graph check, windowpane check and gingham, etc.

Due to digital transformations, apparel images are available in abundant from many sources. Thus, 3 types of images are in general available based on the signals captured by them. First type indicates customer intention when source is open source, second type indicates retailer intension when source is planogram and third type indicates customer buying behavior when sources is Point of Sales (POS).

(1) Type 1 images, interchangeably referred as first type images—Signals carrying recent trend of an apparel pattern, indicating customer's intention or liking—It is inherent in apparel images of open sources such as social media, etc., of recent times and those signals are received by PMM in various ways within scope of the present disclosure. In one embodiment, pattern mining process may receive the plurality of images of the one or more apparels capturing recent trend from social media and the count of images is in proportion to the likes or positive comments made by users. For example, if first image of an apparel has 100 likes and second image has 400 likes, first image is replicated into 100 times and second image is cloned for 400 times before passing into PMM. Social groups/social media are few sources listed for explanation reasons and similar sources are within scope of present disclosure. In another embodiment, pattern mining module may receive the plurality of apparel images by web crawling of websites related with recent editions of online fashion magazines featuring recent feature events and fashion activities and it carries the signals from the fashion experts.

(2) Type 2 images, interchangeably referred as second type images—Signals carrying retailer intention of keeping apparel in store and online and they are received from planogram. Planograms provide information on list of products kept for a period of time for a group of brick and mortar stores and list of products displayed for a period of time in online for a price zone and they will be interconnected to apparel master data to get images (3) Type 3 images, interchangeably referred as third type images—Signals carrying recent apparel pattern buying behavior of customer. (a) In one embodiment, (PMM) may receive the plurality of images from POS system and product master data of the retailer. The images are from the apparels sold in brick and mortar stores of each category of recent times for a group of stores formed based on demography. The trend variation depends on the location of outlets of a retailer as well as category of the apparel, wherein location refers to but is not limited to urban outlets, rural outlets, outlets categorized based on climatic conditions. In rural outlets, candy strips may be the trend and hair strip may be the trend in urban outlets for same period of time. (b) In another embodiment, pattern mining module may receive the plurality of images of apparel of a category under online sold apparels in recent times for a group of customers formed based on their profile and the images may be from the apparels having more searches or more views during recent times. The purchase history of the plurality of customers may include apparels purchased by these individuals during online purchase or apparel browsing history associated with the apparel.

At step 204 of the method 200, the one or more hardware processors 104 classify and tag the plurality of images into a plurality of types based on a source among the plurality of sources associated with each of the plurality of images, wherein the plurality of types comprise (1) the first type indicative of customer intention when the source is the open source, (2) the second type indicative of retailer intention when the source is the retail planogram and (3) the third type indicative of customer buying behavior when the source is the POS system.

However, the images received may fall into various categories. Thus, images of only current category of interest are processed for determining apparel strategies such as 1) apparels to be added and removed in brick and mortar stores and in online retailing of the retailer and 2) advertisement strategies and manufacturing strategies to the retailer based on the estimated lost sales opportunity, over inventory and hit rate. The above two sources of images from (a) offline and (b) online captures the signals carrying recent trend of apparels from buying behavior of customers. In some embodiments, the one or more images received from the plurality of sources may be stored in the database 108 or other databases externally coupled to the system 100 via the I/O interface 106. Those images are grouped based on (a) retail categorization, (b) similarity in appearance.

a) Retail categorization—It will be appreciated that images that belongs to a category or subcategory form a group. Images of apparels that are received from sales history such as brick and mortar stores and online sales have name of the category that are stored in retailer system. Type 2 and Type 3 images have category information. Category is group of products that are having similar buying preferences or having attribute values that are alternative to each other. Example for category are women's tops, women's suits, men's shirts, and men's suits, etc. Those images of one category are processed to form separate vectors by adding each row of an image and mean vector is calculated for a category. This process is repeated for each category and each category may have calculated mean vector and stored as 'reference category mean vector'. Reference category mean vector carry category specific information which differentiate with other categories and may be used to name a group of similar images of unknown sources.

b) Similarity in appearance—Similarity in appearance is used to classify an unknown image into a category as described here: Those images of one category received from Type 2 images are processed to form separate vectors by adding each row of an image and mean vector is calculated for a category. This process is repeated for each category and each category may have calculated mean vector and stored as 'reference category mean vector'. Reference category mean vector carry category specific information which differentiate with other categories and may be used to identify category name and naming with category name for a group of similar images of unknown sources.—Images collected through web crawling from open sources such as fashion magazine websites, social media may not have name of the category of apparel. Type 1 images may not have name of the category. They are passed into well-known unsupervised learning techniques such as clustering. Each row of an image is segregated and added one by one to form a single vector and repeated for every images and distance between those vectors are calculated. The clustering of images is done based on the distance among the images and each cluster mean vector may be calculated and compared with reference category mean vector and named with closest reference category. For example, one cluster of images received from open sources may be named as women tops as mean vector of the cluster of images are very close to reference category mean vector namely women's tops mean vector.

In some embodiments, sub-categories for the one or more categories may form group. For example, sub categories associated with the category the "shirts" category to include men's shirts, women's shirts, boy's shirts, girl's shirts, t-shirts, novelty t-shirts, long-sleeve shirts, sleeveless shirts, workout shirts, swimming shirts, etc. may form a group. While several possible sub-categories for the "shirts" category have been provided, it will be appreciated that other sub-categories are possible within the scope of the present disclosure for various categories defined for the one or more apparels.

In some embodiments, the selection of, which images to process, may be automatic and/or may be defined manually by a user (e.g., using a user interface). In one embodiment, among the two types of images between (a) brick and mortar stores and (b) online, only one is considered at a time and the selection of images between images of (a) brick and mortar stores and (b) online depends on the practical application that suits for (a) brick and mortar stores or (b) online. For example, if online images are processed, the outcomes are used for online practical applications such as online assortment, etc., and if images from brick and mortar stores are processed the outcomes are used for practical applications such as assortment for brick and mortar stores, etc.

The received images are preprocessed by orienting the images, so that all images are in same position of pattern for further processing. The images belong to a group are passed into orientation validation of pattern and adjustment. For example considering category 'T-shirt', patterns such as 'written slogan', 'sports person', 'brand name', 'circle symbol' and 'triangle symbol', etc. and many more unknown patterns are aligned into similar orientation so that hidden patterns across images of a category could be extracted. It is ensured that all the images in a group have similar orientation with respect to pattern using recognition techniques such as those known to those of ordinary skill in the art. It will be appreciated that the one or more patterns of the one or more images, may be brought in similar orientation in various ways within the scope of the present disclosure.

Once the images for the category of interest are preprocessed, then at step 206, the one or more hardware processors 104 determine a breadth, a depth, and a lifespan of the plurality of significant underlying patterns of each type. The plurality of significant patterns are identified for each type among the plurality of types identified by performing principal component analysis (PCA) on a set of images among the plurality of images of apparel patterns tagged to each type. The breadth of the significant underlying patterns represents number of the plurality of significant patterns identified for each type and depth of the significant underlying patterns represents magnitude of each of the plurality significant patterns identified for each type.

Referring to FIG. 3, which is depicting principal component analysis (PCA) based pattern detection by PMM for identifying significant patterns for decision support system of FIG. 1, in accordance with some embodiments of the present disclosure. Identifying the significant pattern using PCA comprises:
  a) Extracting the set of images of a type among the plurality of types, wherein the plurality of images are received from one of the source for a last predefined period. Here each image is represented by a series of pixels in terms of numeric values. For example, the pixels may be of size m×n with m rows and n columns. The data processing module is configured to process one or more images of the apparels received from one of the sources in last predefined period for obtaining source related images, which are processed using PCA to identify significant patterns for each specific sources. Source specific images are extracted from the data collection module. The received images are oriented so that all images are in same position of pattern for further processing. The images belong to a group are passed into orientation validation of pattern and adjustment. It is ensured that all the images in a group have similar orientation with respect to pattern using recognition techniques such as those known to those of ordinary skill in the art.
  b) The received image is converted into a numeric value using suitable techniques
    such as those known to those of ordinary skill in the art. In an embodiment, image is transformed into a vector of length N=mn. Each row of an image is segregated and added one by one to form the single vector. Accordingly, if an image include 'm' rows and 'n' columns and then the vector include 'mn' observations and they carry key information about the pattern displayed in the image.

c) Further, using the single vectors of the images received to be processed for the type for the category of interest are arranged into a matrix. For example, considering if the number of apparels purchased in the predefined period is M, leading to 'M' images then M vectors are used to form a matrix. Each column of matrix represents an image and number of columns of matrix is equal to number of images. Thus, matrix includes plurality of single vectors, wherein each vector among the plurality of single vectors corresponding image in the plurality of images of apparels.

d) In an embodiment, standardization is carried out by subtracting the individual image value with mean image values i.e., each image vector is subtracted from the vector of mean value (the mean vector). As mentioned earlier, the vector of mean value is calculated by considering all the images for every pixel. In an embodiment, the standardized matrix include 'M' columns and 'N' rows. As can be understood, standardization enables bringing the numeric values of each image to a common/standard scale for further processing.

e) Generating a covariance matrix from the standardized segment matrix.

f) Performing the principal component analysis (PCA) on the covariance matrix to generate the set of eigen vectors with corresponding eigen values and factor loadings in which each eigen vector represents an underlying pattern. Each image could be tagged into an underlying pattern based on factor loadings and also the closeness of the image pattern with the underlying pattern is indicated by the magnitude of factor loading. The set of eigen vectors are arranged in decreasing order of variance. In one embodiment, the Eigenvector associated with highest eigenvalue reflects highest variance, and one associated with lowest eigenvalue, smallest variance. In one embodiment, each vector is representing a pattern and the eigenvector with the highest variance represent the top pattern. Eigenvalues decrease exponentially and those patterns which are greater than 1 are considered as significant patterns and they are considered for next level processing. Each underlying top pattern is arrived based on common characteristics that are available across many images. Each image belong to a top underlying pattern and every top underlying pattern is representation of many images.

g) Multivariate distance is calculated between all significant patterns of last predefined period and the lowest value of those distances is considered as 'threshold value'. It is used to decide similarity of two patterns. If two patterns have less than the threshold value then they are considered as similar patterns.

h) Comparison of top patterns across sources—PMM provides top patterns for each source and they are extracted pattern that do not have any names attached to it. For comparison of two patterns derived from PMM, they need to be named so that they can be compared to take business decisions such as apparel to be added or removed.

i) Naming of top underlying pattern—Apparels that belong to a category are collected at corporate level and images of those apparels are collected using master data or similar sources. Master data has apparel details such as color, size, pattern etc., Apparels having one pattern are segregated and their images are collected from suitable image repository maintained by retailer. The images will have minor variations among themselves and those images alone are sent to PMM and underlying patterns are extracted. As known pattern is sent for PMM, the top underlying pattern will have maximum magnitude of that known pattern and it is termed as 'standard underlying pattern' for that known pattern. For example, those images with 'written slogan' are segregated based on master data information and segregated images carrying a known type (written slogan) is sent to PMM for pattern mining. As only one type of pattern is sent for mining, the top underlying pattern derived will have maximum magnitude for that pattern and is termed as 'standard underlying pattern for written slogan' and it will capture the common characteristic present across images of written slogan. It is repeated for another pattern 'x' and 'standard underlying pattern for x' is derived. By this way, 'standard underlying pattern' is derived for all known patterns that exist in master data and a ready reference is created. It is an onetime activity and it will have 'standard underlying pattern' for all known patterns. Ready reference act as (1) ready reference to test any test pattern for its pattern categorization (2) indicator of a pattern of its newness.

j) The unknown pattern derived from open source is compared with each 'standard underlying pattern' of the ready reference using multivariate distance (MVD) and named with name of the 'standard underlying pattern' which has MVD less than threshold value. Same way all the derived pattern of a source is named. In some embodiments, some unknown pattern may not have similar pattern in repository, and they are named as 'new_1', etc. For example, if a new pattern emerges in open forums, the images related to new pattern may be absent in the historical information such as historical planograms and master data. Underlying pattern derived using those images are named as 'new pattern_1' etc.

k) Mapping of each image into a pattern—Each image could be tagged into a top underlying pattern based on factor loadings and also the magnitude of factor loading indicates the closeness of the image pattern with the underlying pattern.

l) The pattern lifespan estimator—In one embodiment, the similarity is computed based on multivariate distance. The multivariate distance is calculated between all significant patterns of last predefined period and the lowest value of those distances is considered as the threshold value. It is used to decide similarity of two patterns. If two patterns have less than the threshold value then they are considered as similar patterns. The process is repeated for every month for the last few years. Every significant pattern is compared with significant patterns of consecutive months for similarity. If a pattern has similar pattern for 'x' consecutive months then its life duration is considered as 'x' months. In this fashion, lifespan for each pattern is calculated using last few years historical data and stored as 'pattern lifespan repository'. The significant pattern for latest month is calculated and its duration is estimated by mapping the pattern with 'pattern lifespan repository' to identify most similar pattern and its lifespan is considered as pattern lifespan of latest month. In addition, retailer needs to consider the expected duration of the current trend of apparel. A fad is a design that continues only one season, or sometimes even less than a season. Military pattern is an examples for fad. A classic pattern is a pattern that continues for longer duration. Simple black dress is an example for classic pattern. The predicted duration of a pattern enables retailers to plan inventory for the upcoming days.

m) The lifespan of the plurality of significant patterns of each type is computed by mapping each of the plurality of significant patterns with a pattern lifespan repository to determine similarity between each of the plurality of significant patterns with type of patterns present in the pattern life span repository based on a similarity threshold value. The similarity threshold value is derived based on a precomputed minimal multivariate distance among significant patterns of previous predefined time spans. The pattern lifespan repository is the repository with the type of patterns and corresponding life span, and wherein the pattern lifespan is number of consecutive months a type of pattern exist. two patterns are considered to be similar if the multivariate distance between the two patterns is lesser than the threshold value.

In this way the PMM provides top underlying patterns (significant patterns), their weights, names, and their lifespan for the 3 types of images described. First type indicates the customer intention, the second type indicates retailer intension and the third type indicates customer's buying behavior. Underlying significant patterns of two sources are compared based on the names assigned to them.

Once top significant underlying patterns are identified for each type, at step 208 of the method 200, one or more hardware processors estimate lost sales opportunity, an over inventory and hit rate of the retailer by comparing breadth and depth of the significant underlying apparel patterns across the plurality of types.

At step 210 of the method 200, the one or more hardware processors recommend apparel strategies comprising 1) apparels to be added and removed in brick and mortar stores and in online retailing of the retailer and 2) advertisement strategies and manufacturing strategies to the retailer based on the estimated lost sales opportunity, the over inventory and the hit rate Decision module depicted in FIG. 3 identifies lost sales opportunity by comparing the top patterns of type 1 images and top patterns of type 2 images provided by PMM and patterns to be added for brick and mortar stores and online retailing. Underlying patterns of two sources are compared based on the names attached to them.

Decision module identifies excess inventory by comparing top patterns of type 2 images with top patterns of type 3 images provided by PMM and patterns to be removed for stores and online retailing.

The table 1 shows breadth and depth of significant underlying patterns derived from three sources by PMM and indicates identified lost sales, over inventory and hit rate for each underlying pattern by decision module Decision module: Computing lost sales, over inventory and hit rate and estimates required quantity to be added or removed.

Once pattern of a source is compared with same pattern derived from other sources and similar pattern is identified based on the name given to each underlying pattern. For example, pattern 'written slogan' derived from type 1 images has depth of 40 showing its potential and has depth of 21 from type 2 images. It indicates that pattern 'written slogan' is the popular pattern in open sources liked by most customers with the magnitude of 40 and it is the second level importance for retailer with magnitude of 21. It is leading a gap of 19 (40−21=19) between customer intention and retailer intension and resulting in lost sales as 19/20=90%. It indicates that pattern 'written slogan' has to be added. The number of units to be added is decided by comparing 19 with 21 which indicates that the units to be added is equal to 90% of existing units of pattern 'written slogan'. It shows that 90% of more patterns as compared to existing pattern in planogram and similar to 'written slogan' need to be added. Pattern 'written slogan' has 36% of hit rate which is derived by considering magnitude of open source (=40) and magnitude of POS and online (15). It indicates 36% of customer intention with respect to 'written slogan' pattern were fulfilled and reflected by their buying behavior. Hit rate of a pattern indicates magnitude proportion of a pattern bought by customer in comparison to their intention magnitude proportion with respect to same pattern.

Pattern 'sports person' derived from type 1 image has depth of 20 showing its medium popularity among customers. It is not derived or considered as significant pattern from type 2 sources leading to lost sales due to pattern 'sports person' as (20−0)/20=100%. It indicates that pattern 'sports person' has to be added, which is entirely new and not available in the existing planogram, Pattern 'brand name' derived from type 2 images has depth of 30 showing the retailer interest in keeping apparels. It has depth of 10 from type 3 images indicating the lower level of buying of pattern 'brand name' by customers. It is leading to gap of 30−10=20 between retailer intention and customer buying intension and resulting in over inventory of 20/30=67%. It indicates that part of pattern 'brand name' has to be removed. The number of units to be removed is decided by comparing 30 with 10 which indicates that the units to be removed is equal to 67% of existing units of pattern 'brand name' in planogram.

TABLE 1

| Type of Images | Source of Images | Breadth and Depth of Significant Patterns Depth (Variance Explained) | | | | | | | | | Breadth (Number of significant patterns) |
| --- | --- | --- | --- | --- | --- | --- | --- | --- | --- | --- | --- |
| | | Top Pattern | | Top Pattern | | Top Pattern | | Top Pattern | | Top Pattern | |
| Type 1 | Open Sources | written slogan | 40 | brand name | 20 | | | | | | 0 | 2 |
| Type 2 | Plannogram | written slogan | 21 | | 0 | sports person | 30 | circle symbol | 15 | triangle symbol | 1 2 | 4 |
| Type 3 | POS and online | written slogan | 15 | | | sports person | 10 | | 0 | | | 3 |
| Lost Sales | | 90% | | 100% | | | | | | | |
| Overstock | | | | | | 67% | | 100% | | | |
| Hit Rate | | 38% | | | | | | | | | |

Pattern 'circle symbol' derived from type 2 image has depth of 15 showing retailer lower interest in keeping apparels having patterns similar to pattern 'circle symbol'. It is not considered as significant pattern from type 3 source and leading to over inventory of 100%. It indicates that pattern 'circle symbol' has to be removed from planogram for entire quantity. Pattern 'Triangle symbol' is addressed using similar approach followed for pattern 'circle symbol'.

As depicted in FIG. 3, the output of Decision module indicating lost sales, over inventory and hit rate is passed into an assortment module, a manufacturing module, and/or an advertisement module. The Decision module output serves as a key input for to decide listings and facings of apparel for group of stores or online. Assortment module provides list of apparels and units of apparels to be kept in stores and online. Manufacturing module provides details of apparels to be manufactured such as stores or online, required patterns, size, color, brand, etc. and those details act as key for apparel manufacturing, Advertisement module provides details about product images, category, channel, etc. Assortment module may receive the information related with the gap in top patterns, their weights, from the decision module and may incorporate into the existing algorithm and adjust the recommended listings and facings of each apparel for a group of stores or online retailing.

Decision module is interconnected to assortment module and passes the information that pattern 'written slogan' has to be added. The units to be added is equal to 90% of existing units of pattern 'written slogan'. As depicted in Table 1, each image of open sources is tagged into underlying pattern 'written slogan' or underlying pattern 'sports person' based on closeness/similarity given by factor loading. It provides list of images that falls into corresponding underlying pattern namely 'written slogan' or 'sports person'. Images that belong to 'written slogan' are segregated and It provides list of images that falls into 'written slogan' pattern and are sorted based on factor loading. The first image of sorted list will be closest to 'written slogan' and last image of sorted list will be farthest to 'written slogan'. The images in the sorted list are considered one by one in ascending order and compared with images of planogram and those images which are common are noted as planogram_written slogan and those images which are differing are noted as no_plannogram_written slogan. The comparison is done based on multivariate distance between two source of images. No_plannogram_opensource has the list of images that are available in the sorted list of 'written slogan' of open source and they are not available in planogram. It indicates those images having popularity among customers and was not kept by retailer in a store or online and need to be available for customers by bringing from back room or by manufacturing those apparels. The top 'x' number of images are selected and sent to manufacturing module and DOM/ERP system for integrated planning. Here 'x' is the number of units which equal to 90% of existing units of pattern 'written slogan' in planogram.

Assortment modules receives information from Decision module that 100% 'sports person' of open sources need to be added. It indicates those images having popularity among customers and was not kept by retailer in a store or online and need to be available for customers by bringing from back room or by manufacturing. Each image of open sources is tagged into underlying patterns and images that belong to 'sports person' are segregated and It provides list of images that falls into 'sports person' pattern and are sorted based on factor loading. The images in the sorted list are considered one by one in ascending order and top 'y' number of images (In this example all images) are selected and sent to manufacturing module and DOM/ERP system for integrated planning.

Decision module interconnected to assortment module and passes the information that part of pattern 'brand name' has to be removed and the units to be removed is equal to 67% of existing units of 'brand name' in planogram. Each image of planogram is tagged into underlying pattern 'written slogan' or 'brand name' or' circle symbol' or ' triangle symbol' based on closeness/similarity given by factor loading. It provides list of images that falls into corresponding underlying pattern. Images that belong to underlying pattern 'brand name' are segregated and It provides list of images that falls into 'brand name' and are sorted based on factor loading. The first image of sorted list will be closest to 'brand name' and last image of sorted list will be relatively farther to 'brand name'. The apparel images covering bottom 67% of the sorted list are removed from existing planogram.

Decision module interconnected to assortment module and passes the information that 'circle symbol' and 'Triangle symbol' has to be removed from planogram for entire quantity. Each image of planogram is tagged into underlying pattern and images that belong to underlying pattern 'circle symbol' and 'Triangle symbol' are segregated and are removed from existing planogram.

Decision module may interact with a distributed order management (DOM) system or other systems such as an enterprise resource planning (ERP) system to obtain or receive the apparel with specific pattern (from DSS) to be added for the plurality of brick and mortar stores and online retailing. For finding required apparels or comparing two patterns, similarity using threshold value is applied. A DOM system may generally include a system or software with applications designed to intelligently arrange orders across the multiple systems by providing a single, global view of all inventory and retail stores and online of a business.

In another embodiment, decision module is interconnected with advertisement module of retailer to decide the design to be advertised for the current season. Decision module may interact with advertising module by providing the patterns with high hit rate. to consider for advertisement. Here hit rate of a pattern indicates the magnitude proportion of a pattern bought by customer in comparison to their intention magnitude proportion with respect to same pattern.

In another embodiment Decision module interconnected with manufacturing module that decides manufacturing of apparels for current season. Decision module thus identifies lost sales opportunity and identifies patterns to be added for brick and mortar stores and online retailing. Manufacturing module may receive the information related with the gap in top patterns, their weights, from decision module and may incorporate into the existing manufacturing listings for a group of stores and online retailing.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for detection of hidden patterns for apparel strategies, the method comprising:
   receiving, by one or more hardware processors, a plurality of images of apparel patterns for a predefined time span from a plurality of sources comprising (1) open source (2) retail planogram and (3) point of sales (POS) system of a retailer;
   classifying and tagging, by the one or more hardware processors, the plurality of images into a plurality of types based on a source of each of the plurality of images, wherein the plurality of types comprise (1) a first type indicative of customer intention when the source is the open source, (2) a second type indicative of retailer intention when the source is the retail planogram and (3) a third type indicative of customer buying behavior when the source is the POS system;
   identifying, by the one or more hardware processors, a plurality of underlying patterns for each type among the plurality of types by performing principal component analysis (PCA) on a set of images among the plurality of images of apparel patterns tagged to each type and determining a breadth, a depth and a lifespan of the plurality of underlying patterns of each type;
   estimating, by the one or more hardware processors, a lost sales opportunity, an over inventory, and a hit rate of the retailer by comparing breadth and depth of the underlying patterns across the plurality of types; and
   recommending, by the one or more hardware processors, a plurality of apparel strategies comprising 1) apparels to be added and removed in brick and mortar stores and in online retailing of the retailer and 2) advertisement strategies and manufacturing strategies to the retailer based on the estimated lost sales opportunity, the over inventory and the hit rate.

2. The method of claim 1, wherein the breadth of the apparel patterns represents number of the plurality of underlying patterns identified for each type and depth of the apparel patterns represents magnitude of each of the plurality underlying patterns identified for each type.

3. The method of claim 1, wherein identifying the plurality of underlying patterns for each type based on the PCA, comprises:
   extracting the set of images of a type among the plurality of types, wherein each of the set of images is represented by a series of pixels in terms of numeric values;
   generating a single vector of pixels for each image among the set of images, wherein each single vector corresponding to each image is generated by sequentially appending each row of an image among the set of images;
   creating, for the type, an image matrix comprising a plurality of single vectors, wherein each vector among the plurality of single vectors corresponds to an image among the set of images;
   standardizing the image matrix to generate a standardized image matrix by subtracting a mean image vector from a value of each of the plurality of single vectors of the image matrix, wherein the mean image vector is computed by averaging every pixel of the set of images within the type;

generating a covariance matrix from the standardized segment matrix; and performing the principal component analysis (PCA) on the covariance matrix to generate a set of eigen vectors with corresponding eigen values and factor loadings, in which the breadth of apparel pattern is equal to a number of patterns having eigen values greater than one which are termed as underlying patterns and the depth of the apparel pattern is represented by the eigen values of a corresponding eigen vector and closeness of image with pattern is represented by factor loading of the image.

4. The method of claim 1, wherein a lifespan of the plurality of underlying patterns of each type is computed by mapping each of the plurality of underlying patterns with a pattern lifespan repository to determine similarity between each of the plurality of underlying patterns with a type of pattern, present in the pattern life span repository based on a similarity threshold value derived based on a precomputed minimal multivariate distance among underlying patterns of previous predefined time spans, and wherein the pattern lifespan repository is a repository with the type of patterns and corresponding life span, and wherein the pattern lifespan is a number of consecutive months a type of pattern exists.

5. The method of claim 1, wherein estimating the lost sales opportunity, the over inventory and the hit rate of the retailer comprises:
  determining a) lost sales magnitude and b) apparel patterns to be added by comparing the breadth and the depth of a underlying pattern of the first type with the second type; and
  determining a) over inventory magnitude and b) apparel pattern to be removed by comparing breadth and depth of the underlying pattern of the second type with the third type; and
  determining a) hit rate and b) apparels to be advertised by comparing breadth and depth of a underlying pattern of the first type and the third type.

6. The method of claim 1, wherein a number of units to be added for entirely new pattern identified in the plurality of underlying patterns is decided by considering corresponding eigen values of new pattern.

7. A system for detection of hidden patterns for apparel strategies, the system comprising:
  a memory storing instructions;
  one or more Input/Output (I/O) interfaces; and
  one or more hardware processors coupled to the memory via the one or more I/O interfaces, wherein the one or more hardware processors are configured by the instructions to:
    receive a plurality of images of apparel patterns for a predefined time span from a plurality of sources comprising (1) open source (2) retail planogram and (3) point of sales (POS) system of a retailer;
    classify and tag the plurality of images into a plurality of types based on a source of each of the plurality of images, wherein the plurality of types comprise (1) a first type indicative of customer intention when the source is the open source, (2) a second type indicative of retailer intention when the source is the retail planogram and (3) a third type indicative of customer buying behavior when the source is the POS system;
    identify a plurality of patterns for each type among the plurality of types by performing principal component analysis (PCA) on a set of images among the plurality of images of apparel patterns tagged to each type and determine a breadth, a depth and a lifespan of the plurality of underlying patterns of each type;
    estimate a lost sales opportunity, an over inventory, and a hit rate of the retailer by comparing the breadth and the depth of the plurality of underlying patterns across the plurality of types; and
    recommend a plurality of apparel strategies comprising 1) apparels to be added and removed in brick and mortar stores and in online retailing of the retailer and 2) advertisement strategies and manufacturing strategies to the retailer based on the estimated lost sales opportunity, the over inventory and the hit rate.

8. The system of claim 7, wherein the breadth of the underlying patterns represents number of the plurality of underlying patterns identified for each type and depth of the apparel patterns represents magnitude of each of the plurality underlying patterns identified for each type.

9. The system of claim 7, wherein the one or more hardware processors are configured to identify the plurality of patterns for each type, based on the PCA by:
  extracting the set of images of a type among the plurality of types, wherein each of the set of images is represented by a series of pixels in terms of numeric values;
  generating a single vector of pixels for each image among the set of images, wherein each single vector corresponding to each image is generated by sequentially appending each row of an image among the set of images;
  creating, for the type, an image matrix comprising a plurality of single vectors, wherein each vector among the plurality of single vectors corresponds to an image among the set of images;
  standardizing the image matrix to generate a standardized image matrix by subtracting a mean image vector from a value of each of the plurality of single vectors of the image matrix, wherein the mean image vector is computed by averaging every pixel of the set of images within the type;
  generating a covariance matrix from the standardized segment matrix; and
  performing the principal component analysis (PCA) on the covariance matrix to generate a set of eigen vectors with corresponding eigen values and factor loadings, in which the breadth of apparel pattern is equal to a number of patterns having eigen values greater than one and the depth of the apparel pattern is represented by the eigen values of a corresponding eigen vector and closeness of image with pattern is represented by factor loading of the image.

10. The system of claim 7, wherein a lifespan of the plurality of underlying patterns of each type is computed by mapping each of the plurality of underlying patterns with a pattern lifespan repository to determine similarity between each of the plurality of underlying patterns with a type of pattern, present in the pattern life span repository based on a similarity threshold value derived based on a precomputed minimal multivariate distance among patterns of previous predefined time spans, and wherein the pattern lifespan repository is a repository with the type of patterns and corresponding life span, and wherein the pattern lifespan is a number of consecutive months a type of pattern exists.

11. The system of claim 7, wherein the one or more hardware processors are configured to estimate the lost sales opportunity, the over inventory, and the hit rate of the retailer by:

determining a) lost sales magnitude and b) apparel patterns to be added by comparing the breadth and the depth of underlying apparel pattern of the first type with the second type; and determining a) over inventory magnitude and b) apparel pattern to be removed by comparing breadth and depth of a underlying pattern of the second type with the third type; and determining a) hit rate and b) apparels to be advertised by comparing breadth and depth of a underlying apparel pattern of the first type and the third type.

12. The system of claim 7, wherein a number of units to be added for entirely new pattern identified in the plurality of underlying patterns is decided by considering corresponding eigen values of new pattern.

13. One or more non-transitory machine-readable information storage mediums comprising one or more instructions, which when executed by one or more hardware processors causes a method for detection of hidden patterns for apparel strategies, the method comprising:

receiving, by one or more hardware processors, a plurality of images of apparel patterns for a predefined time span from a plurality of sources comprising (1) open source (2) retail planogram and (3) point of sales (POS) system of a retailer;

classifying and tagging, by the one or more hardware processors, the plurality of images into a plurality of types based on a source of each of the plurality of images, wherein the plurality of types comprise (1) a first type indicative of customer intention when the source is the open source, (2) a second type indicative of retailer intention when the source is the retail planogram and (3) a third type indicative of customer buying behavior when the source is the POS system;

identifying, by the one or more hardware processors, a plurality of underlying patterns for each type among the plurality of types by performing principal component analysis (PCA) on a set of images among the plurality of images of apparel patterns tagged to each type and determining a breadth, a depth and a lifespan of the plurality of underlying patterns of each type;

estimating, by the one or more hardware processors, a lost sales opportunity, an over inventory, and a hit rate of the retailer by comparing breadth and depth of the underlying patterns across the plurality of types; and recommending, by the one or more hardware processors, a plurality of apparel strategies comprising 1) apparels to be added and removed in brick and mortar stores and in online retailing of the retailer and 2) advertisement strategies and manufacturing strategies to the retailer based on the estimated lost sales opportunity, the over inventory and the hit rate.

* * * * *